(12) United States Patent
Haerth et al.

(10) Patent No.: US 10,899,059 B2
(45) Date of Patent: Jan. 26, 2021

(54) METHOD FOR PRODUCING FILMS BASED ON PLASTICIZED POLYVINYL ACETAL HAVING A PREDEFINED VISCOSITY

(71) Applicant: KURARAY EUROPE GMBH, Hattersheim (DE)

(72) Inventors: Michael Haerth, Troisdorf (DE); Daniel Wenzlik, Wiesbaden (DE)

(73) Assignee: KURARAY EUROPE GmbH, Hattersheim (DE)

( * ) Notice: Subject to any disclaimer, the term of this patent is extended or adjusted under 35 U.S.C. 154(b) by 306 days.

(21) Appl. No.: 15/963,210

(22) Filed: Apr. 26, 2018

(65) Prior Publication Data
US 2018/0326638 A1 Nov. 15, 2018

(30) Foreign Application Priority Data

May 12, 2017 (EP) .................................. 17170927

(51) Int. Cl.
*B29C 48/00* (2019.01)
*B29C 48/21* (2019.01)
(Continued)

(52) U.S. Cl.
CPC ............ *B29C 48/022* (2019.02); *B29C 48/00* (2019.02); *B29C 48/21* (2019.02); *B29C 48/72* (2019.02);
(Continued)

(58) Field of Classification Search
CPC ....... B29C 48/022; B29C 48/08; B29C 48/00; B29C 48/72; B29C 48/21; B29C 48/92; B29C 2948/92704; B29C 2948/92876; B29C 2948/92961; B29C 2948/922; B29C 2948/92361; B29C 2948/92695;
(Continued)

(56) References Cited

U.S. PATENT DOCUMENTS

| 2,904,844 A | * | 9/1959 | Smithies | ................ | C08K 5/103 |
| | | | | | 264/211 |
| 4,213,747 A | * | 7/1980 | Friedrich | ................ | B29C 48/92 |
| | | | | | 425/144 |

(Continued)

FOREIGN PATENT DOCUMENTS

| WO | 2008040943 A2 | 4/2008 |
| WO | 2009016534 A2 | 2/2009 |

OTHER PUBLICATIONS

European Search Report corresponding to EP Application No. EP 17 17 0927, dated Oct. 20, 2017, 2 pages.

*Primary Examiner* — Jeffrey M Wollschlager
(74) *Attorney, Agent, or Firm* — Brooks Kushman P.C.

(57) ABSTRACT

Plasticized polyvinylacetal films with greater film-to-film uniformity are produced by a process of extruding a melt stream containing a polyvinyl acetal and a plasticizer at 150-250° C., the film having a predefined melt viscosity at 60-170° C., by providing a first melt stream of at least a first plasticizer and a first polyvinyl acetal resin and measuring its melt viscosity at 60-170° C. online; and adjusting the 60-170° C. melt viscosity by adding a second plasticizer and/or a second polyvinyl acetal resin to the first melt stream in an amount to provide a second melt stream with a melt viscosity at 60-170° C. having a difference of at most 20% to the predefined melt viscosity at 60-170° C.

18 Claims, 2 Drawing Sheets

(51) Int. Cl.
  *B29C 48/92* (2019.01)
  *B32B 17/10* (2006.01)
  *B29C 48/72* (2019.01)
  *C08J 3/18* (2006.01)
  *C08J 5/18* (2006.01)
  *B29K 29/00* (2006.01)
  *B29K 31/00* (2006.01)
  *B29K 105/00* (2006.01)

(52) U.S. Cl.
  CPC ........ B29C 48/92 (2019.02); B32B 17/10605 (2013.01); B32B 17/10761 (2013.01); C08J 3/18 (2013.01); C08J 5/18 (2013.01); *B29C 2948/922* (2019.02); *B29C 2948/92361* (2019.02); *B29C 2948/92695* (2019.02); *B29C 2948/92704* (2019.02); *B29C 2948/92857* (2019.02); *B29C 2948/92876* (2019.02); *B29C 2948/92961* (2019.02); *B29K 2029/14* (2013.01); *B29K 2031/04* (2013.01); *B29K 2105/0038* (2013.01); *B29K 2829/14* (2013.01); *C08J 2329/14* (2013.01)

(58) Field of Classification Search
  CPC .... B29C 2948/92857; B32B 17/10761; B32B 17/10605; B29K 2105/0038; B29K 2029/14; B29K 2829/14; B29K 2031/04; C08J 2329/14; C08J 3/18; C08J 5/18; C08K 5/103; C08K 5/12; C08L 29/14
  See application file for complete search history.

(56) References Cited

U.S. PATENT DOCUMENTS

| | | | | | |
|---|---|---|---|---|---|
| 4,448,736 | A | * | 5/1984 | Emery | B29C 48/92 264/40.1 |
| 4,468,953 | A | * | 9/1984 | Garritano | G01N 11/14 73/54.32 |
| 4,817,416 | A | * | 4/1989 | Blanch | G01N 11/08 73/54.04 |
| 4,992,487 | A | * | 2/1991 | Rao | C08J 3/00 523/303 |
| 5,014,545 | A | * | 5/1991 | Rao | G01N 11/04 73/54.09 |
| 5,078,007 | A | * | 1/1992 | Tadros | G01N 33/442 73/54.14 |
| 5,347,852 | A | * | 9/1994 | Mode | G01N 11/08 73/54.04 |
| 5,708,197 | A | * | 1/1998 | Todd | G01N 11/14 73/54.28 |
| 5,959,195 | A | * | 9/1999 | Gottfert | G01N 11/08 137/92 |
| 5,974,866 | A | * | 11/1999 | Tjahjadi | G01N 11/08 73/54.11 |
| 6,129,450 | A | * | 10/2000 | Braun | B29B 7/48 366/83 |
| 6,182,503 | B1 | * | 2/2001 | Mode | G01N 11/08 137/110 |
| 6,691,558 | B1 | * | 2/2004 | Lin | G01N 11/08 73/54.01 |
| 6,691,561 | B2 | * | 2/2004 | Lin | G01N 11/08 73/54.42 |
| 6,840,092 | B2 | * | 1/2005 | Eggen | G01N 11/08 73/54.11 |
| 2008/0272513 | A1 | | 11/2008 | Stenzel | |
| 2010/0028642 | A1 | * | 2/2010 | Steuer | B32B 17/10761 428/220 |
| 2010/0206374 | A1 | | 8/2010 | Karpinski et al. | |
| 2014/0275390 | A1 | | 9/2014 | Ma et al. | |
| 2015/0306853 | A1 | * | 10/2015 | Beekhuizen | B32B 27/306 428/334 |
| 2016/0101595 | A1 | * | 4/2016 | Muguruma | B32B 7/02 428/212 |
| 2016/0159043 | A1 | * | 6/2016 | Karagiannis | B32B 17/10761 428/220 |

* cited by examiner

METHOD FOR PRODUCING FILMS BASED ON PLASTICIZED POLYVINYL ACETAL HAVING A PREDEFINED VISCOSITY

CROSS-REFERENCE TO RELATED APPLICATIONS

This application claims priority to European Patent Application No. 17170927.2 filed May 12, 2017, the disclosure of which is incorporated in its entirety by reference herein.

BACKGROUND OF THE INVENTION

1. Field of the Invention

The present invention relates to a method to produce films based on plasticized polyvinyl acetal by extrusion with loop-back online melt viscosity control.

2. Description of the Related Art

It has long been known to produce interlayer films based on plasticized polyvinyl acetal by extrusion. Common to these extrusion processes is that a melt comprising plasticized polyvinyl acetal, usually plasticized polyvinylbutyral, is extruded through a thin die to produce a melt film. The shape of this melt film is then fixed or "frozen" by cooling in air and/or water. The melt temperature during the extrusion process is generally in a range of 150-250° C.

For producing a glass laminate, the thus produced film is placed between glass sheets to produce a stack which is then subjected to elevated temperature and pressure. During or before the lamination process, air is either removed from stack by pressure or physically dissolved in the PVB film. This so called de-airing process can be impaired by PVB films having a too high a viscosity under lamination conditions, resulting in visible air pockets, especially in the edge regions of the laminate. Glass laminates with visible air pockets will not be accepted by a costumer and need to be scrapped.

Since the chemistry and therefore the viscosity of polyvinyl acetal resin varies within certain ranges, the melt viscosity under lamination conditions of the extruded plasticised polyvinyl acetal varies too. For example, FIG. 1 shows a Gaussian distribution of MFR values, measured at 100° C. and 21.6 kg, of plasticised polyvinyl acetal resin. Accordingly, the films will have a similar distribution of mechanical properties and a similar distribution of lamination properties (i.e. melt viscosity under lamination conditions).

In order to adjust the viscosity level or to narrow the viscosity distribution, it is feasible to mix two polyvinyl acetal grades with different molar mass and/or branching architecture and/or different amounts of plasticizer. An example for the adjustment of the viscosity level is given, e.g. in U.S. 2014/0275390, where it is disclosed that the weight average molar mass and therefore the viscosity can be reduced by using hydrogen peroxide as an reactive agent during extrusion.

However, adjustment of viscosity during extrusion to a predefined level is very time-consuming, as one has to measure the flow behavior of the resin before the extrusion process and based on the results of this measurement one has to calculate the amount of the added polyvinyl acetal with a different molar mass and/or branching architecture, the amount of the plasticizer and/or the amount of the reactive agent. Furthermore, meticulous rheological measurements e.g. with rheometer in oscillation or dynamic mode, capillary rheometer or simply with an MFR equipment, typically require a specific specimen preparation as e.g. moisture content significantly influences the results. This procedure requires long preparations times, which is cumbersome for a continuous extrusion process.

Aside from rheological measurements, one could speculate about using specific extrusion parameters like melt pressure to calculate the required amount of one or more of the above-named components in order to adjust the viscosity. However, it was found that the melt viscosity under lamination conditions i.e. in a temperature range of 60 to 160° C. cannot be predicted from the melt viscosity or from any related process parameter at extrusion temperatures i.e. in a temperature range of 150 to 250° C. by the well-known time-temperature superposition principle, indicating that polyvinyl acetal resins show a so-called complex thermorheological behaviour.

Obviously, there is a need to provide a method to control the melt viscosity at lamination temperatures of 60 to 170° C., preferably 80-150° C. during a film extrusion process for plasticised polyvinyl acetal at temperatures between 150 and 250° C., preferably between 170 and 250° C.

SUMMARY OF THE INVENTION

An object of the invention was to provide an extrusion process for plasticised polyvinyl acetal film wherein the viscosity of the film can be adjusted by measuring the viscosity of the melt at lamination temperatures. These and other objects are achieved by a process for extruding a melt stream at 150-250° C., preferably at 170-250° C., the melt stream comprising at least one polyvinyl acetal and at least one plasticizer having a predefined melt viscosity at 60-170° C., preferably 80-150° C., characterized by providing a first melt stream comprising at least a first plasticizer and a first polyvinyl acetal resin and measuring online its melt viscosity at 60-170° C., preferably 80-150° C.; adding a second plasticizer and/or a second polyvinyl acetal resin to the first melt stream in an amount to provide a second melt stream with a melt viscosity at 60-170° C., preferably 80-150° C., having a difference of at most 20%, preferably of at most 10% with respect to the predefined melt viscosity at 80-150° C.

DETAILED DESCRIPTION OF THE PREFERRED EMBODIMENTS

Figure 1:
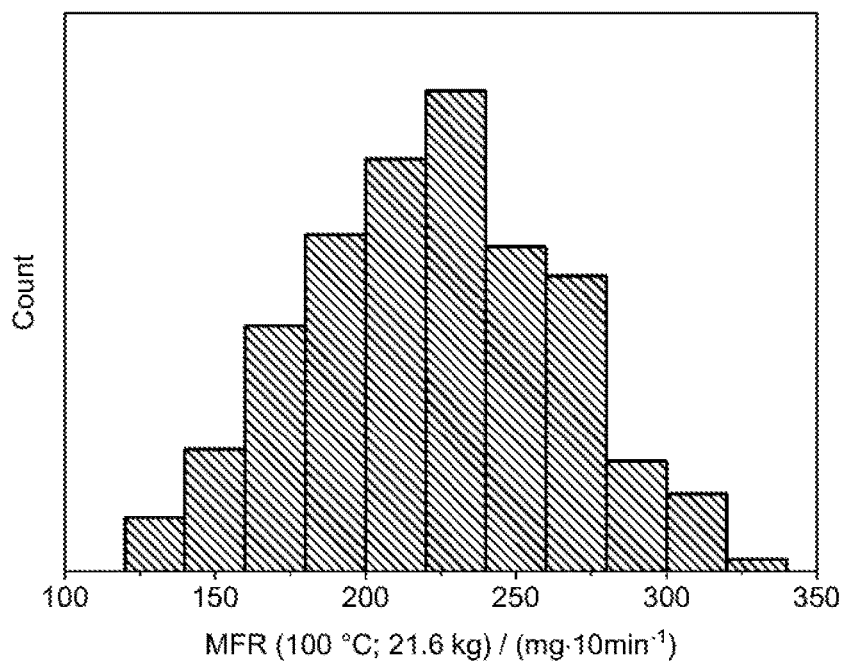
FIG. 1 shows a typical distribution of MFR values measured at 100° C. and 21.6 kg.
Figure 2:
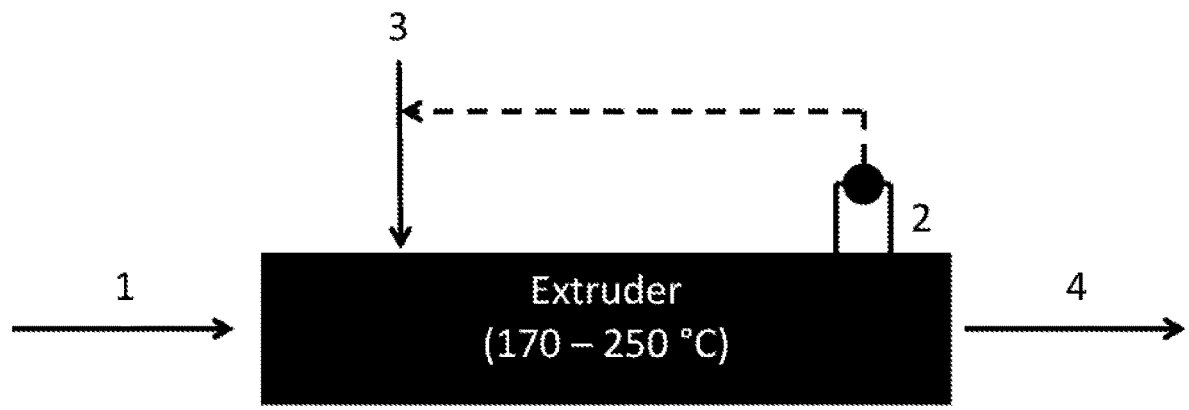
FIG. 2 gives an overview of the process of the invention. 1) melt stream comprising at least a first plasticizer and a first polyvinyl acetal resin; 2) measurement equipment for melt viscosity measurements at 80-150° C.; 3) stream of a second plasticizer and/or a second polyvinyl acetal resin and/or a reactive agent; 4) mixture of components of 1) and 3) leading to melt stream with predefined viscosity at 80-150° C.

The predefined melt viscosity, measured e.g. as an MFR value at 60 or 80° C. and 21.6 kg is typically in the range of 1 mg/10 min to 500 mg/10 min and at 150 or 170° C. measured with 10 kg of 0.1 g/10 min to 20 g/10 min.

The melt viscosity at 80-150° C. can be measured as melt flow rate (MFR), melt volume rate (MVR), rheometry in oscillation, dynamic or creep mode, or capillary rheometry. In a preferred embodiment the viscosity is measured as MFR/MVR or by a capillary rheometer.

The melt viscosity can be measured by commercially available online rheometers. In the process of the invention, a small side stream is diverted from the main stream and feed into a capillary die (circular or slit) of a rheometer by a gear pump. This gear pump enables controlled and constant flow volume of the melt. A second gear pump beyond the capillary die conveys the polymer melt back to the main stream. By using more than one side stream or by changing the revolution speed of the gear pump various shear rates can be obtained. This enables the construction of a shear rate dependent viscosity curve.

In a variation of the process, the small side stream is heated to a lower temperature than the mass temperature in the extruder, which enables viscosity measurements at lamination temperatures.

Specific rheological parameters, that can be measured with online rheometry may be MFR, MVR, pressure, shear viscosity, flow rate ratio MFR (weight 1)/MFR (weight 2), and flow exponent.

Preferably, the second plasticizer and/or second polyvinylacetal resin is added to the melt stream in an iterative process to reach the predefined melt viscosity.

It is not necessary to subject the entire first melt stream to the measurement of the melt viscosity at 60-170° C. or 80-150° C. In a first embodiment, the first melt stream is heated to a temperature of 150-250° C. or 170-250° C. and a part of the first melt stream is separated and cooled to 60-170° C. or 80-150° C. for measuring its melt viscosity at 60-170° C. or 80-150° C.

Preferably, the second plasticizer and/or second polyvinylacetal resin is added to the melt stream upstream of the separation of the part of the first melt stream. While it is possible to discharge the separated melt stream, in order to use all material for the extrusion process, the separated melt stream may be combined with the first melt stream after measuring its melt viscosity at 60-170° C. or 80-150° C.

In further embodiments of the invention, the second plasticizer is identical with the first plasticizer and/or the second polyvinyl acetal resin is identical with the first second polyvinyl acetal resin. In other words, the melt viscosity is adjusted by adjusting the ratio between plasticizer and polyvinyl acetal resin. Since the mechanical properties of the final extruded film depend heavily on the plasticizer content, it is advisable to use this embodiment only within changes of the plasticizer content in view of the first melt stream of ±5 wt. %, preferably at ±2 wt. % and most preferably at ±wt. %.

Figure 3:
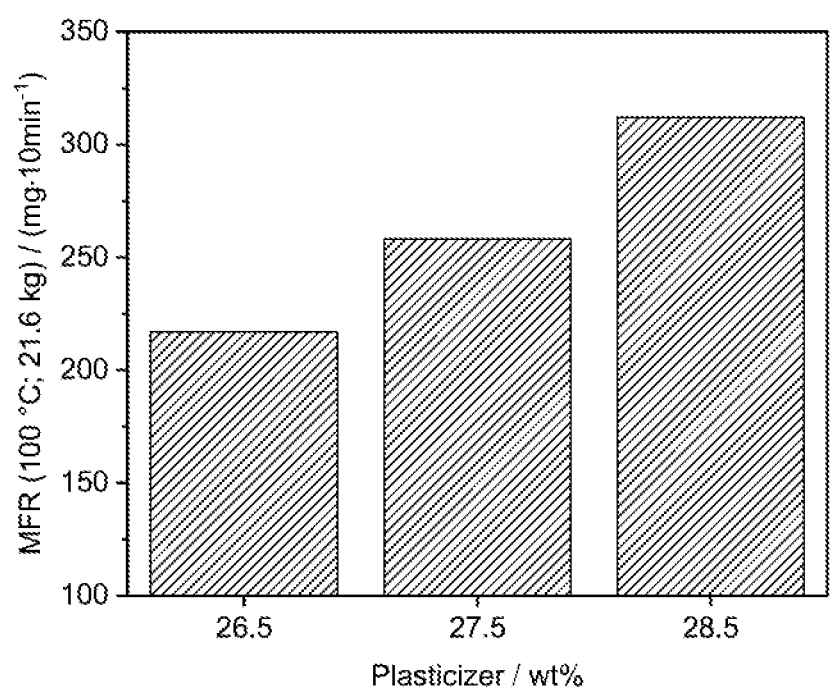
FIG. 3 shows the influence of different amounts of plasticizer on the MFR at 100° C. with 21.6 kg.

An example for this adjustment is given in FIG. 3. For this experiment the first polyvinyl acetal resin was extruded with 26.5 wt. % plasticizer, leading to an MFR value, measured at 100° C. and 21.6 kg, of 217 mg/10 min. By adding different amounts of plasticizer (1 or 2 wt. % in the example), the MFR value can be adjusted to the predefined viscosity level.

In yet another embodiment, the melt viscosity is adjusted by adding a second polyvinyl acetal resin having an at least 5% higher or lower melt viscosity at 80-150° C. than the first polyvinyl acetal resin. Preferably this is done in an iterative process.

The second plasticizer and/or the second polyvinyl acetal resin may be added to the first melt during at any point of the process, i.e. upstream of the extruder or into the extruder, or even downstream of the extruder provided that a sufficient mixing of the components is ensured.

Another object of the invention was to provide an extrusion process for films comprising more than one layer of plasticised polyvinyl acetal wherein the viscosity of at least one layer can be adjusted by measuring the viscosity of the melt at lamination temperatures.

It should be noted that the number of melt streams is not limited, but in practice, three, four or five layers are coextruded into one final film.

In one embodiment of the process of the invention, at least two melt streams having different compositions are extruded in contact with each other, wherein at least one melt stream is provided with a predefined melt viscosity at 60-170° C. according to steps a) and b).

In another embodiment of the process of the invention, three melt streams are extruded in contact with each other, wherein the outer melt streams are provided with a predefined melt viscosity at 60-170° C. according to steps a) and b).

In another embodiment of the process of the invention, three melt streams are extruded in contact with each other, wherein the inner melt stream is provided with a predefined melt viscosity at 60-170° C. according to steps a) and b).

In another embodiment of the process of the invention, three melt streams are extruded in contact with each other, wherein all the melt streams are provided with the same or different predefined melt viscosity at 60-170° C. according to steps a) and b).

In these embodiments, the layers may have the same of a different composition in terms of chemical nature and amount of the polyvinylacetal and plasticizer. In a preferred variant, three layers are coextruded, wherein the outer layers have the same composition and the inner layer has a different composition as the outer layers.

Polyvinyl Acetal Resin

In the process of the invention one or more chemically different polyvinyl acetal resin may be used as first and second polyvinyl acetal resin. Such polyvinyl acetals may differ in polyvinyl alcohol content, degree of acetalization, residual acetate content, ethylene proportion, molecular weight and/or chain lengths of the aldehyde of the acetal groups.

The polyvinyl acetal resins used in accordance with the invention are produced by reaction of at least one polyvinyl alcohol with one or more aliphatic or aromatic, branched or unbranched compounds with one or more carbonyl functions such as aldehydes and ketones, containing 2 to 10 carbon atoms. To this end, n-butyraldehyde or iso-butyraldehyde are preferably used to obtain n- and/or iso-polyvinylbutyral which are preferentially used in the invention.

The first and/or second polyvinyl acetal resins may have a content of polyvinyl acetate groups of 0.1 to 20 mol %, preferably 0.5 to 3 mol %, or 5 to 8 mol %.

The polyvinyl alcohol content of the used polyvinyl acetals may be between 14-26% by weight, 16-24% by weight, 17-23% by weight and preferably between 18 and 21% by weight.

Additives

The first and/or second melts may contain alkali metal ions and/or earth alkali metal ions to adjust their adhesion level to glass (so called Anti-Adhesion Additives). The concentrations given below are based on the final film.

The total amount of alkali metal salts may be as low as 0.005% by weight based on the weight of the interlayer film.

Preferred ranges of alkali metal salt are 0.01%-0.1%; 0.02-0.08%; and 0.03-0.06%, each weight % based on the weight of the film.

Plasticizer

The plasticizer content of the melts used in accordance with the invention is not of particular importance and may be adjusted as needed for the mechanical properties of the final film. As the person skilled in the art is aware, the plasticizer content of such films is typically adjusted in a broad range of 0 to 80% by weight.

However, preferred plasticizer contents of the melts used in accordance with the invention would fall into the ranges of 0-16% by weight, more preferably between 0 and 8% by weight for plasticizer-reduced films; 14.0-45.0% by weight, preferably 15.0-32.0% by weight and in particular 26.0-30.0% by weight for standard films and 25-80% by weight, preferably 25-60% by weight, and in particular 30 to 45% by weight for sound-damping films.

As plasticisers, one or more compounds selected from the following groups may be used:
  esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate;
  esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate;
  phosphates with aliphatic or aromatic ester alcohols, such as tris(2-ethylhexyl)phosphate (TOF), triethyl phosphate, diphenyl-2-ethylhexyl phosphate, and/or tricresyl phosphate; and/or
  esters of citric acid, succinic acid and/or fumaric acid.

Preferably, 1,2-cyclohexane dicarboxylic acid diisononyl ester (DINCH) or triethylene glycol-bis-2-ethyl hexanoate (3GO or 3G8) are used as plasticisers.

In addition, the melts may contain further additives, such as residual quantities of water, UV absorbers, antioxidants, adhesion regulators, optical brighteners or fluorescent additives, stabilizers, colorants, processing aids, inorganic or organic nanoparticles, pyrogenic silicic acid and/or surface active substances.

The method according to the invention may be used produce interlayer films for laminated glass and/or adhesion films for photovoltaic modules.

Lamination Process

The film produced with the method of the present invention is used as an interlayer to produce glass laminates.

Lamination processes are known to the person skilled in the art. For example, so-called autoclave processes are carried out at an increased pressure from approximately 10 to 15 bar and temperatures from 100 to 150° C. during approximately 2 hours. Vacuum bag or vacuum ring methods (in a sense that no subsequent autoclave treatment is required), for example according to EP 1 235 683 B1, function at approximately 200 mbar and 130 to 145° C.

Vacuum laminators can also be used for the lamination process. These consist of a chamber that can be heated and evacuated, in which laminated glass can be laminated within 30-60 minutes. Reduced pressures from 0.01 to 300 mbar and temperatures from 100 to 200° C., in particular 130-160° C., have proven their worth in practice.

What is claimed is:

1. A process for reducing fluctuations in melt viscosity of a plasticized polyvinyl acetal product at a first temperature greater than or equal to 60° C. and less than or equal to 170° C., where the plasticized polyvinyl acetal is melted and extruded at a second temperature which is an extrusion temperature which is different from said first temperature, and is greater than or equal to 150° C. and less than or equal to 250° C., the process comprising:
  a) establishing a predefined value of melt viscosity of plasticized polyvinyl acetal at said first temperature;
  b) providing a first composition comprising at least one polyvinyl acetal and at least one plasticizer;
  c) melting and extruding said first composition at the extrusion temperature and measuring the melt viscosity at said first temperature;
  d) providing a second composition different from the first composition, the second composition comprising one or more polyvinyl acetals, one or more plasticizers, or a mixture thereof;
  e) adjusting the melt viscosity at said first temperature by varying the amount of said second composition added to said first composition in the extruder to form an adjusted composition,
wherein the melt viscosity of the adjusted composition is within ±20% of the predefined melt viscosity at said first temperature, measured under the same conditions as step c).

2. The process of claim 1, wherein the first temperature is lower than the extrusion temperature.

3. The process of claim 1, wherein the extrusion temperature is a temperature greater than or equal to 170° C. and less than or equal to 250° C. and the first temperature is greater than or equal to 60° C. and less than or equal to 160° C.

4. The process of claim 1, wherein the extrusion temperature is a temperature greater than or equal to 150° C. and less than or equal to 250° C. and the first temperature is greater than or equal to 60° C. and less than or equal to 145° C.

5. The process of claim 1, wherein the extrusion temperature is a temperature greater than or equal to 170° C. and less than or equal to 250° C. and the first temperature is greater than or equal to 60° C. and less than or equal to 145° C.

6. The process of claim 1, wherein the second composition is added to the first composition upstream of the location where step c) is performed.

7. The process of claim 1, wherein the first composition is extruded at a temperature between 150° C. and 250° C. and a part of the first composition is separated and cooled to a temperature between 60° C. to 170° C. for measuring the melt viscosity at the first temperature.

8. The process of claim 7, wherein the second composition is added to the first composition upstream of the separation of the part of the first composition.

9. The process of claim 7, wherein the separated first composition is recombined with the first composition in the extruder after measuring its melt viscosity at said first temperature.

10. The process of claim 1, wherein the second composition contains the same plasticizer(s) as the first composition, and contains no polyvinyl acetal.

11. The process of claim 1, wherein the second composition contains no plasticizer, and the polyvinyl acetal(s) contained in the second composition are the same as the polyvinyl acetal(s) contained in the first composition.

12. The process of claim 1, wherein the first composition contains but a single polyvinyl acetal, and the second composition contains the same polyvinyl acetal.

13. The process of claim 1, wherein the first composition is molten and at a temperature of 150° C. to 250° C. inclusive, and the second composition is added to the first composition in molten form at a temperature between 150° C. to 250° C. inclusive.

14. The process of claim 1, wherein at least two melt streams having different compositions are extruded in contact with each other, and wherein at least one melt stream is provided with a predefined melt viscosity at the first temperature according to steps a) through e).

15. The process of claim 14, wherein three melt streams are extruded in contact with each other, and wherein the outer melt streams are provided with a predefined melt viscosity at the first temperature according to steps a) through e).

16. The process of claim 14, wherein three melt streams are extruded in contact with each other, wherein the inner melt stream is provided with a predefined melt viscosity at the first temperature according to steps a) through e).

17. The process of claim 1, wherein said first temperature is a laminating temperature for laminating glass panes.

18. The process of claim 1, wherein the polyvinyl acetal product is an extruded polyvinyl acetal film, further comprising the step of laminating glass panes employing the extruded polyvinyl acetal film, the laminating taking place at said first temperature.

* * * * *